(12) United States Patent
Okamura

(10) Patent No.: US 7,355,742 B2
(45) Date of Patent: Apr. 8, 2008

(54) APPARATUS AND METHOD FOR CONTROLLING PAGE BREAK POSITION

(75) Inventor: Koji Okamura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1032 days.

(21) Appl. No.: 10/387,405

(22) Filed: Mar. 14, 2003

(65) Prior Publication Data

US 2003/0182629 A1    Sep. 25, 2003

(30) Foreign Application Priority Data

Mar. 20, 2002 (JP) ............... 2002-078921
Feb. 18, 2003 (JP) ............... 2003-040037

(51) Int. Cl.
*H04N 1/40* (2006.01)
(52) U.S. Cl. ............ 358/1.18; 358/1.15; 358/468
(58) Field of Classification Search ...... 358/1.15–1.18, 358/468, 449, 488
See application file for complete search history.

(56) References Cited

U.S. PATENT DOCUMENTS 4,631,596 A * 12/1986 Yaguchi ............ 358/449
4,809,344 A * 2/1989 Peppers et al. ........ 382/173

FOREIGN PATENT DOCUMENTS

| JP | 2-307155 | 12/1990 |
| JP | 6-152896 | 5/1994 |
| JP | 7-58940 A | 3/1995 |
| JP | 11-15749 A | 1/1999 |
| JP | 2000-066867 | 3/2000 |
| JP | 2000-259614 | 9/2000 |
| JP | 2001-337811 | 12/2001 |
| JP | 2002-063013 | 2/2002 |
| JP | 2003345556 A * | 12/2003 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

This invention has as its object to provide an image processing apparatus and method which can reliably and appropriately insert a page break by a simple process. To accomplish this, it is checked if the number of lines transferred to a printer is smaller than a page break reference line count N. N is a value equal to or smaller than a value obtained by subtracting the number of vertical dots of a maximum font that a browse task can rasterize from a maximum recordable line count Max. When data for the page break reference line count N or more have been transferred to the printer, it is checked if data of the transferred line has the same color. If the data for one line have the same color, it can be determined that the line does not contain any character (the spacing between neighboring lines). Hence, if a page break is inserted at that line, characters can be prevented from being printed across two pages.

5 Claims, 8 Drawing Sheets

Figure 1:
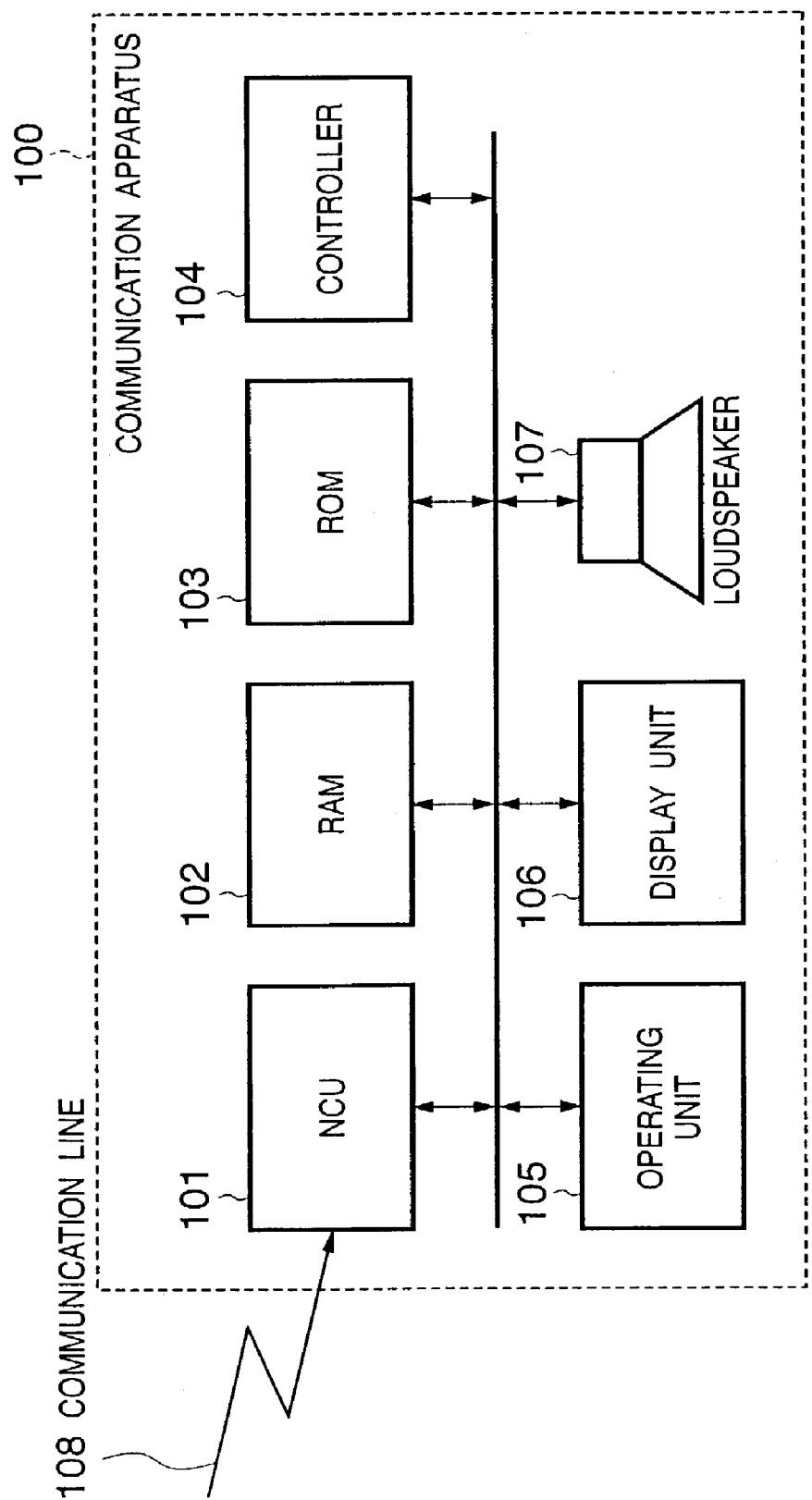

APPARATUS AND METHOD FOR CONTROLLING PAGE BREAK POSITION

FIELD OF THE INVENTION

The present invention relates to an image processing apparatus and, more particularly, to an image processing apparatus which can record a document on cut sheets.

BACKGROUND OF THE INVENTION

Conventionally, a technique for controlling a page break position so as not to break characters in such image processing apparatus has been proposed.

For example, as a recording method of an HTML file, a method of rasterizing an HTML file in a reduced scale to fall within a recording range, or a method of putting characters which may break at a page break position into the next page is known, as disclosed in Japanese Patent Laid-Open No. 11-15749. Also, as a facsimile recording method, a method of searching for a full blank line closest to a printable maximum line so as not to break characters at a page break position on a given received facsimile page, and breaking a page at the found full blank line is known, as disclosed in Japanese Patent Laid-Open No. 7-58940.

However, in Japanese Patent Laid-Open No. 11-15749, a rasterization process in a reduced scale and a process for putting characters into the next page must be done upon rasterizing an HTML file. Also, in Japanese Patent Laid-Open No. 7-58940, a page break position cannot be determined until data are rasterized up to a maximum number of recordable lines.

For this reason, in Japanese Patent Laid-Open No. 11-15749, a rasterization process for display and that for print must be independently done, or the rasterization process for print must be taken into consideration upon executing the rasterization process for display. Also, upon application of Japanese Patent Laid-Open No. 7-58940, data must be rasterized up to a maximum number of recordable lines, and a large buffer size and complicated processes are required.

SUMMARY OF THE INVENTION

Accordingly, an object of the present invention is to provide an apparatus and method, which can reliably and appropriately insert a page break by a simple process.

According to the present invention, the foregoing object is attained by providing an image processing apparatus for determining a page break position on the basis of image data to be printed, comprising detection means for detecting a line, which is formed of only pixels contained within a predetermined color range, in a predetermined image region located at a trailing end of a page, and determination means for determining the line detected by the detection means as a page break position.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 1 is a block diagram showing a facsimile apparatus 100 with a Web browser function according to an embodiment of the present invention;

FIG. 2 is a chart showing an example of the flow of data processes in the embodiment;

FIG. 3 is a flow chart showing the Web print operation of a browse task in the embodiment;

FIG. 4 is a flow chart showing the Web print operation of a print task in the embodiment;

FIG. 5 is a chart showing an example of the flow of data processes of a facsimile apparatus with a Web browser function according to the second embodiment of the present invention;

FIG. 6 is a flow chart showing the Web print operation of a browse task of the second embodiment;

FIG. 7 is a flow chart showing the Web print operation of a data conversion task of the second embodiment; and FIG. 8 is a flow chart showing the Web print operation of a print task of the second embodiment.

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

A cut sheet type facsimile apparatus with a Web browser function will be described hereinafter as an embodiment of the present invention.

FIG. 1 is a block diagram showing a facsimile apparatus 100 with a Web browser function according to an embodiment of the present invention.

Referring to FIG. 1, reference numeral 108 denotes a communication line. Upon Web browsing, the apparatus establishes connection to an IP network via an IP network provider by way of the communication line 108. Upon facsimile communications, the apparatus communicates with a partner terminal via the communication line 108.

Reference numeral 101 denotes an NCU which is used to establish connection to the IP network provider and partner terminal via the communication line 108. The apparatus of this embodiment is connected to the communication line 108 via the NCU 101. Assume that the NCU 101 has a function of electrically isolating between the communication line 108 side and the interior of the apparatus, a function of seizing/releasing a line, outputting dial pulses/tones, and monitoring a line in accordance with instructions from a controller 104, a facsimile modem function, a data modem function, and the like.

Reference numeral 102 denotes a RAM which stores a reception buffer, display buffer, recording buffer, phone directory data, control data, and the like.

Reference numeral 103 denotes a ROM which stores a control program of the controller 104, and initial values of various setups.

Reference numeral 104 denotes a controller which comprises a microprocessor or the like, and controls the functional blocks shown in FIG. 1 in accordance with a program stored in the ROM 103.

Reference numeral 105 denotes an operating unit which comprises a keyboard, pointing device, and the like, and forms a user interface together with a display unit 106 (to be described later). The operating unit 105 accepts operator's Web browse operation, print operation, those associated with call origination/call reception/registration, and the like, and notifies the controller 104 of operator's operations.

Reference numeral 106 denotes a display unit which displays information that the operator is to be informed such as Web browse display, a dial number upon originating a call, status of the apparatus, and the like.

Reference numeral 107 denotes a loudspeaker which is used to monitor a speech signal on the line, to call an operator, and to generate operation or error tones. In order to output such speech from the loudspeaker 107, a speech synthesis circuit, amplifier, and the like are used.

Figure 2:
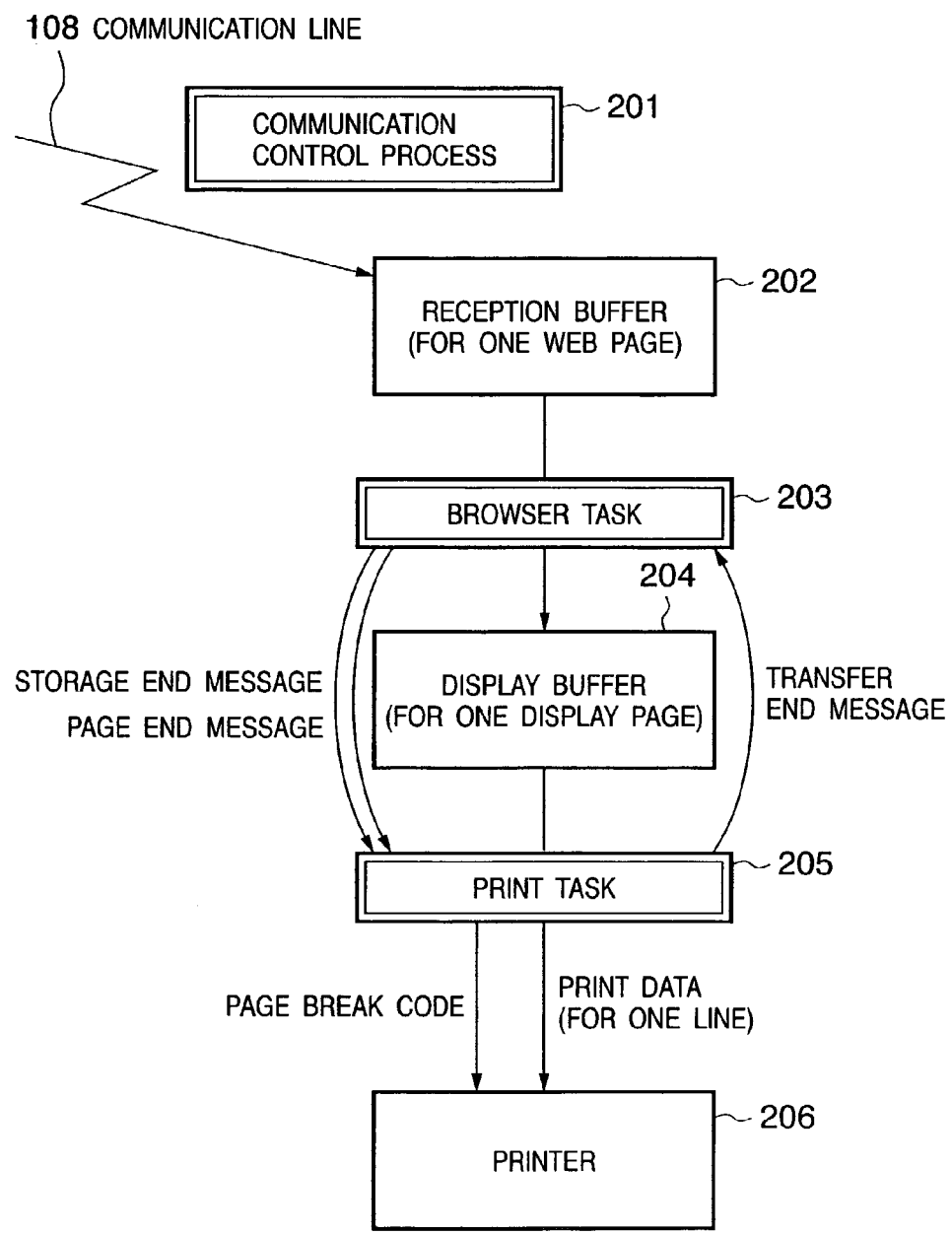

FIG. 2 shows an example of the flow of data processes of this embodiment.

A communication control process 201 stores data coming from the communication line 108 in a reception buffer 202. The reception buffer 202 stores data for one Web page.

A browse task 203 converts data for one Web page, which is stored in the reception buffer 202 and is described in a markup language, into display data, and stores a given size of data, which can be simultaneously displayed on the display unit, of the converted data in a display buffer 204. Upon completion of storage of data in the display buffer 204, the browser task 203 sends a storage end message to a print task 205.

Upon receiving the storage end message, the print task 205 reads out data from the display buffer 204, converts the readout data into print data for each line, and transfers the print data to a printer 206. Upon completion of transfer, the print task 205 sends a transfer end message to the browser task 203. Upon reception of the transfer end message, the browser task 203 stores the next display data in the display buffer 204 if such data remains, and sends a storage end message to the print task 205. On the other hand, if the data for one Web page have been stored, and no next display data remains, the browser task 203 sends a page end message to the print task 205. By repeating the above processes, data for one page are transferred to the printer 206, thus implementing a Web print process.

The reason why data is transferred from the browser task 203 to the print task 205 via the display buffer 204 for each data size that can be displayed at the same time is to commonize a Web browse display process and Web print process.

A detailed description will be given using the flow charts shown in FIGS. 3 and 4.

Figure 3:
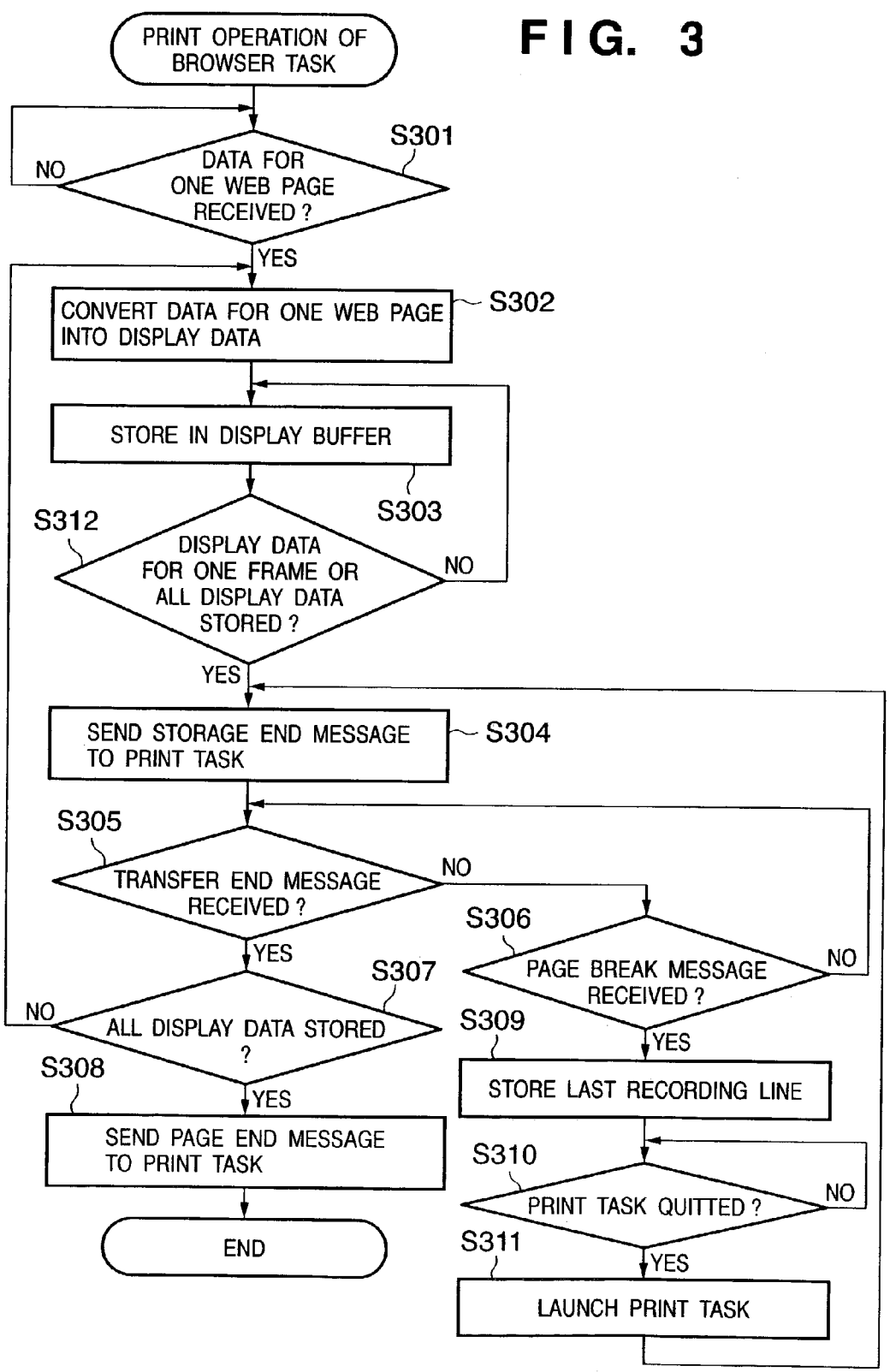

FIG. 3 is a flow chart showing the Web print operation of the browser task 203 of this embodiment.

It is checked in step S301 if data for one Web page is received by the reception buffer 202. If YES in step S301, the flow advances to step S302; if NO in step S301, step S301 is executed again to wait for reception of data.

In step S302, the received data for one page is converted into display data, and the flow advances to step S303.

In step S303, the converted display data begins to be stored in the display buffer. If it is determined in step S312 that display data with a size for one frame that can be displayed by the display unit 106 or all converted display data are stored in the display buffer 204, the flow advances to step S304, and a storage end message is sent to the print task 205. If the display data is not stored yet, the flow returns to step S303 to continue the storage process.

In this case, the total number of lines contained in the display data stored in the display buffer 204 is appended as additional information to the storage end message to be sent.

It is checked in step S305 if a transfer end message is received from the print task 205.

Note that the transfer end message indicates that the print task 205 has transferred all display data stored in the display buffer 204 to the printer 206. Hence, upon receiving this transfer end message, the control starts a process for storing next display data in the display buffer 204.

That is, the flow advances to step S307 to check if all display data have already been stored in the display buffer 204. If display data to be stored in the display buffer 204 still remain, the flow returns to step S303 to newly store the next display data in the display buffer 204.

If it is determined in step S307 that all display data for one Web page have been stored in the display buffer 204 and have been transferred to the printer, the flow advances to step S308, and a page end message is sent to the print task 205.

Prior to descriptions of step S306 and steps S309 to S311, the process by the print task 205 will be explained below using FIG. 4.

Figure 4:
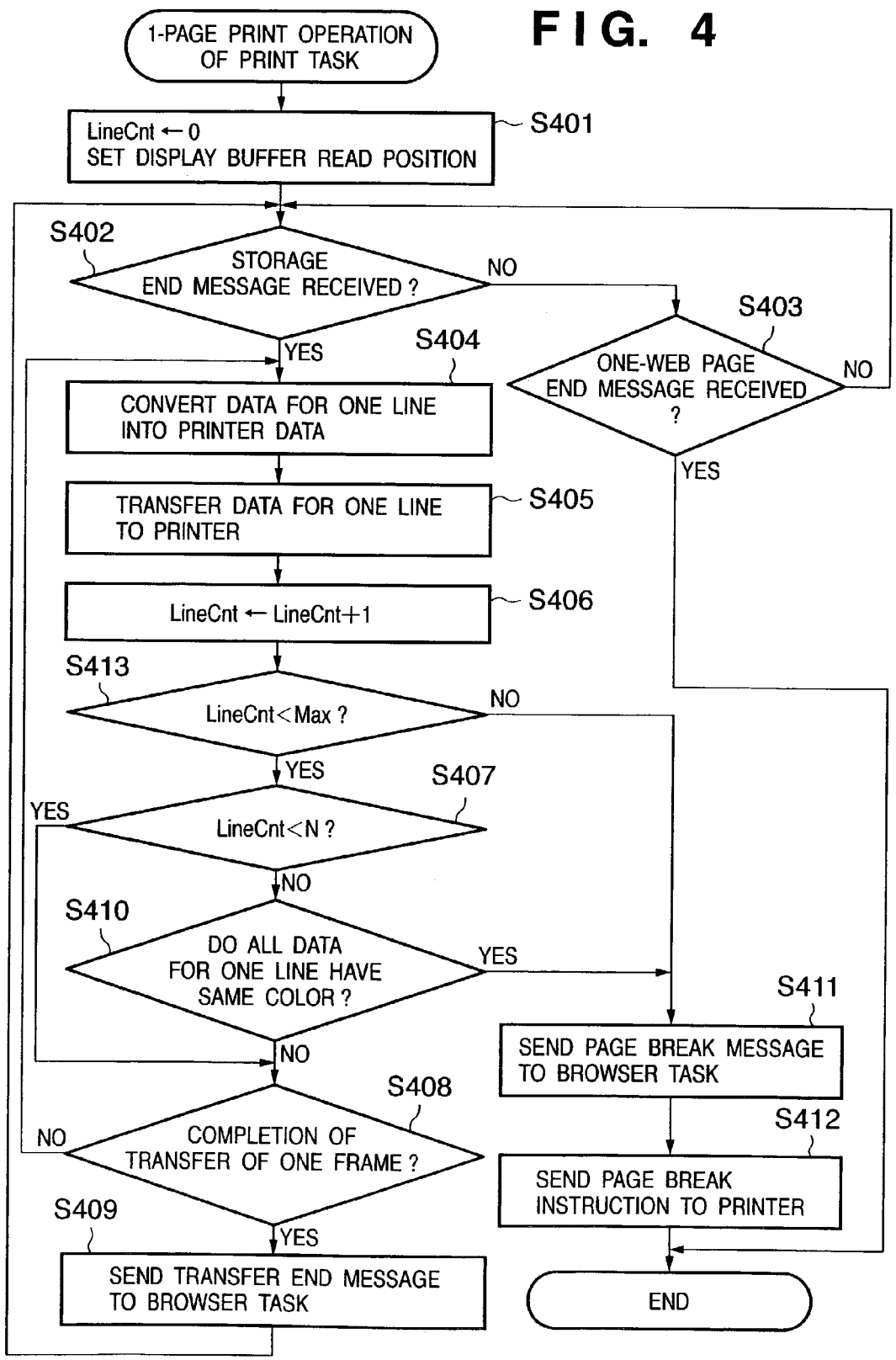

FIG. 4 is a flow chart showing the Web print operation of the print task 205 of this embodiment.

In step S401, various counters and the like are initialized. Zero is substituted in control variable LineCnt, and the head position of the display buffer is set at the read start position from the display buffer in case of recording of one Web page onto the first recording sheet.

It is checked in step S402 if the storage end message is received from the browser task 203. If YES in step S402, the flow advances to step S404.

In step S404, data for one line is read out from the display buffer, and is converted into print data. In step S405, the data for one line, which has been converted in step S404, is transferred to the printer 206, and the flow advances to step S406. In step S406, control variable LineCnt is incremented by "1".

It is checked in step S413 if control variable LineCnt is smaller than Max. Note that Max is a maximum recordable line count per page of recording sheets. If the number of processed lines is equal to or larger than the maximum recordable line count Max at that time, the flow advances to step S411 to send a page break message to the browser task 203. At the same time, a page break instruction is sent to the printer 206 to quit the print task 205 in step S412. That is, the print task 205 is launched and quitted for each page of recording sheets.

If it is determined in step S413 that control variable LineCnt is smaller than Max, lines that can be recorded on a recording sheet still remain. In this case, the flow advances to step S407 to check if control variable LineCnt is smaller than N. If YES in step S407, the flow jumps to step S408; otherwise, the flow advances to step S410. Note that N is a page break reference line count, and is a value obtained by subtracting the number of vertical dots of a maximum font that can be rasterized by the browser task from the maximum recordable line count Max, or a value slightly smaller than that value. For example, in case of an A4 size, if the maximum recordable line count is 3800 and the number of vertical dots of a maximum font is 120, N is set to be 3680 or less. In this manner, if it is checked in step S410 whether or not page break is required when the number of lines of the remaining recording region becomes equal to or smaller than the number of vertical dots of a maximum font, characters are never printed across two recording sheets.

It is checked in step S408 using the number of stored lines contained in the storage end message received in step S403 if display data stored in the display buffer have been transferred to the printer 206. If transfer is complete, the flow advances to step S409; otherwise, the flow returns to step S404 to transfer data for the next line. In step S409, a transfer end message is sent to the browser task 203. The flow then returns to step S402 to wait for storage of the next data.

On the other hand, if data for the page break reference line count N or more have been transferred to the printer, the flow advances from step S407 to step S410 to check if all transferred data of one line have the same color. If all data for one line have the same color, it can be determined that no characters are contained in that line (the spacing between neighboring lines). Hence, if a page break is inserted at that line, characters can be prevented from being printed across two pages. Despite a monochrome or color page, if all data for one line have the same color, it can be determined that they correspond to a background, and a line to break a page can be determined.

Hence, if all data for one line have the same color, the flow advances to step S411 to pass a page break message to the browser task 203. At the same time, a page break code is output to the printer 206 in step S412, thus ending the process.

If it is determined in step S410 that all data for one line do not have the same color, it is determined that this line includes characters or a pattern. Hence, the flow advances to step S408 to process the next line.

In this manner, display data stored in the display buffer are processed, and upon receiving a page end message from the browser task 203, the flow advances from step S402 to step S403 to end the process of the print task 205.

If no page end message is received, the flow returns from step S403 to step S402 to wait for reception of a storage end message.

If the print task 205 inserts a page break, a page break message is sent to the browser task 204 in place of the transfer end task. In the browser task 204, the flow advances from step S305 to step S309 via step S306 in FIG. 3. The page break message contains information that pertains to the last recording line in the display buffer. That is, the print task 205 passes the page break message which contains the position of display data in the display buffer, which is converted into print data immediately before a page break, to the browser task 204.

In step S309, the last recording line in the display buffer, which is contained in the page break message is stored. The control waits for the end of the print task (e.g., the end of the process in step S412) in step S310, and launches the print task again in step S311. In this case, a value is passed to the print task 205 so that a line next to the last recording line stored in step S309 becomes a recording start line in the display buffer. That is, upon recording on the second or subsequent recording sheet, a line next to the last recording line stored in step S309 is set to be the read start position from the display buffer in step S401. In this manner, when one Web page cannot be recorded on a single recording sheet, recording on the second recording sheet can start from a line next to the last recording line of the first sheet on the display buffer, which is stored in step S309.

After the print task 205 is launched again in step S311, the flow returns to step S304 to send a storage end message again. In this manner, in the print task 205, the flow advances from step S401 to step S404 via step S402, thus generating printer data for the first line of the next page.

With the aforementioned processes, upon printing a document on a Web, which is described using a markup language, when the number of lines which have been transferred to the printer becomes equal to or larger than a threshold value obtained by subtracting the vertical size (the number of dots) of a maximum font from the number of lines that can be recorded on one page, it is checked if all pixel data contained in one line to be transferred to the printer have the same color. If all pixel data have the same color, a page break instruction is output to the printer. In this manner, characters can be easily prevented from being broken at a page break position by executing a checking process for each line.

In the above embodiment, whether or not a page break is to be inserted is determined by examining if all pixel data contained in one line have the same color. However, the present invention is not limited to such specific process. For example, if all pixel data contained in one line fall within a predetermined density or color range, page break control may be done.

(Second Embodiment)

A cut sheet type facsimile apparatus with a Web browser function according to the second embodiment of the present invention will be described hereinafter.

Since the hardware arrangement of the facsimile apparatus of this embodiment is the same as that of the first embodiment, a description thereof will be omitted.

Figure 5:
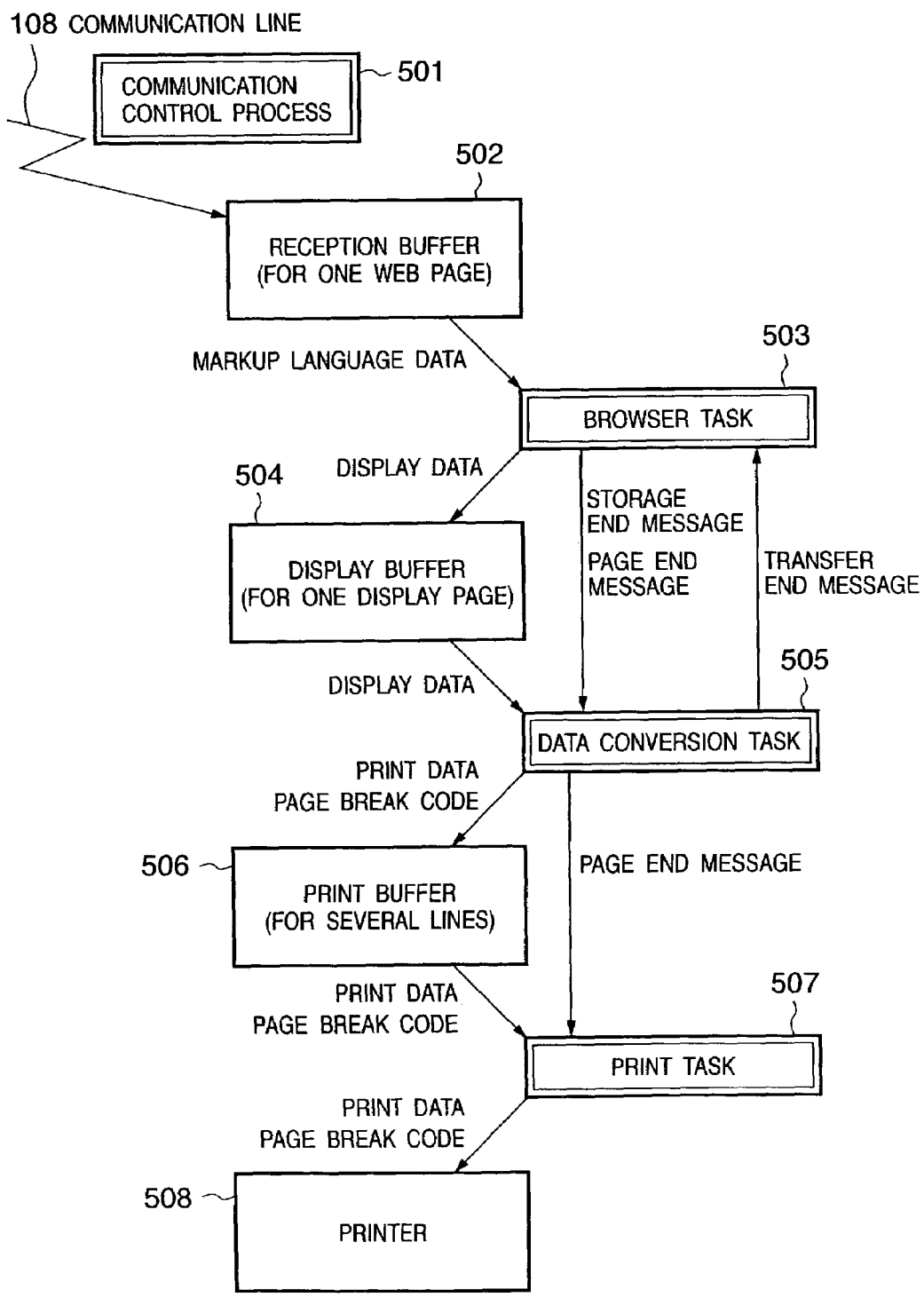

FIG. 5 shows an example of the flow of processes in the facsimile apparatus with a Web browser function according to the second embodiment.

A communication control process 501 stores data coming from the communication line 108 in a reception buffer 502. The reception buffer 502 stores data for one Web page.

A browse task 503 converts data for one Web page, which is stored in the reception buffer 502 and is described in a markup language, into display data, and stores a given size of data, which can be simultaneously displayed on the display unit, of the converted data in a display buffer 504. Upon completion of storage of data in the display buffer 504, the browser task 503 sends a storage end message to a data conversion task 505.

Upon reception of the storage end message, the data conversion task 505 reads out data from the display buffer 504, converts the readout data into print data for each line after it confirms that a print buffer 506 has a free space, and transfers the converted data to the print buffer 506. Upon completion of transfer, the task 505 sends a transfer end message to the browser task 503. Upon reception of the transfer end message, the browser task 503 stores the next display data in the display buffer 504 if such data remains, and sends a storage end message to the data conversion task 505. On the other hand, if the data for one Web page have been stored, and no next display data remains, the browser task 503 sends a page end message to the data conversion task 505. Upon reception of the page end message, the data conversion task sends a page end message to a print task 507.

The print task 507 reads out data and executes a print process of the readout data if data are stored in the print buffer. If no data is stored in the print buffer, the print task confirms if a page end message is received. If the page end message is received, the print task ends a print process. If data read out from the print buffer is a page break code, the print task executes a page break process; if it is print data, it executes a print process.

By repeating the aforementioned processes, data for one page is printed, thus implementing a Web print process.

The reason why data is transferred from the browser task 503 to the data conversion task 505 via the display buffer 504 for each data size that can be displayed at the same time is to commonize a Web browse display process and Web print process.

A detailed description will be given using the flow charts shown in FIGS. 6, 7, and 8.

Figure 6:
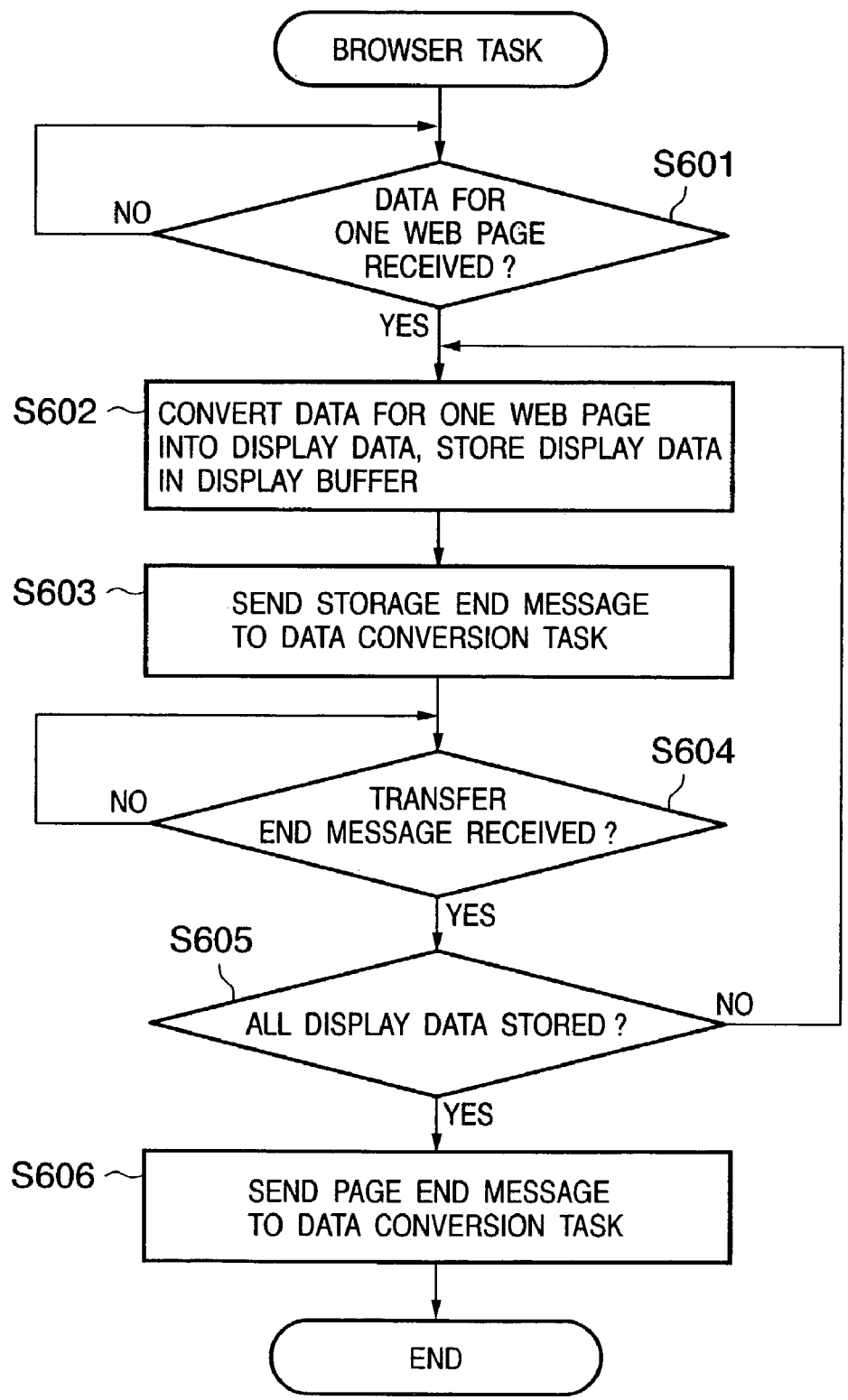

FIG. 6 is a flow chart showing the Web print operation of the browser task 503 of this embodiment.

It is checked in step S601 if data for one Web page is received in the reception buffer 502. If YES in step S601, the flow advances to step S602; otherwise, step S601 is executed again to wait for data reception.

In step S602, the received data for one page is converted into display data, and is stored in the display buffer 504. The flow then advances to step S603.

In step S603, a storage end message is sent to the data conversion task 505.

In this case, the total number of lines contained in the display data stored in the display buffer 504 is appended as additional information to the storage end message to be sent.

It is checked in step S604 if a transfer end message is received from the data conversion task 505.

Note that the transfer end message indicates that the data conversion task 505 has converted all display data stored in the display buffer 504 into print data and has stored them in the print buffer.

Hence, upon receiving this transfer end message, the control starts a process for storing next display data in the display buffer 504.

That is, the flow advances to step S605 to check if all display data have already been stored in the display buffer 504. If display data to be stored in the display buffer 504 still remain, the flow returns to step S602 to newly store the next display data in the display buffer 504.

If it is determined in step S605 that all display data for one Web page have been stored in the display buffer 504 and have been transferred to the print buffer, the flow advances to step S606, and a page end message is sent to the data conversion task 505, thus ending the print process for one Web page.

Figure 7:
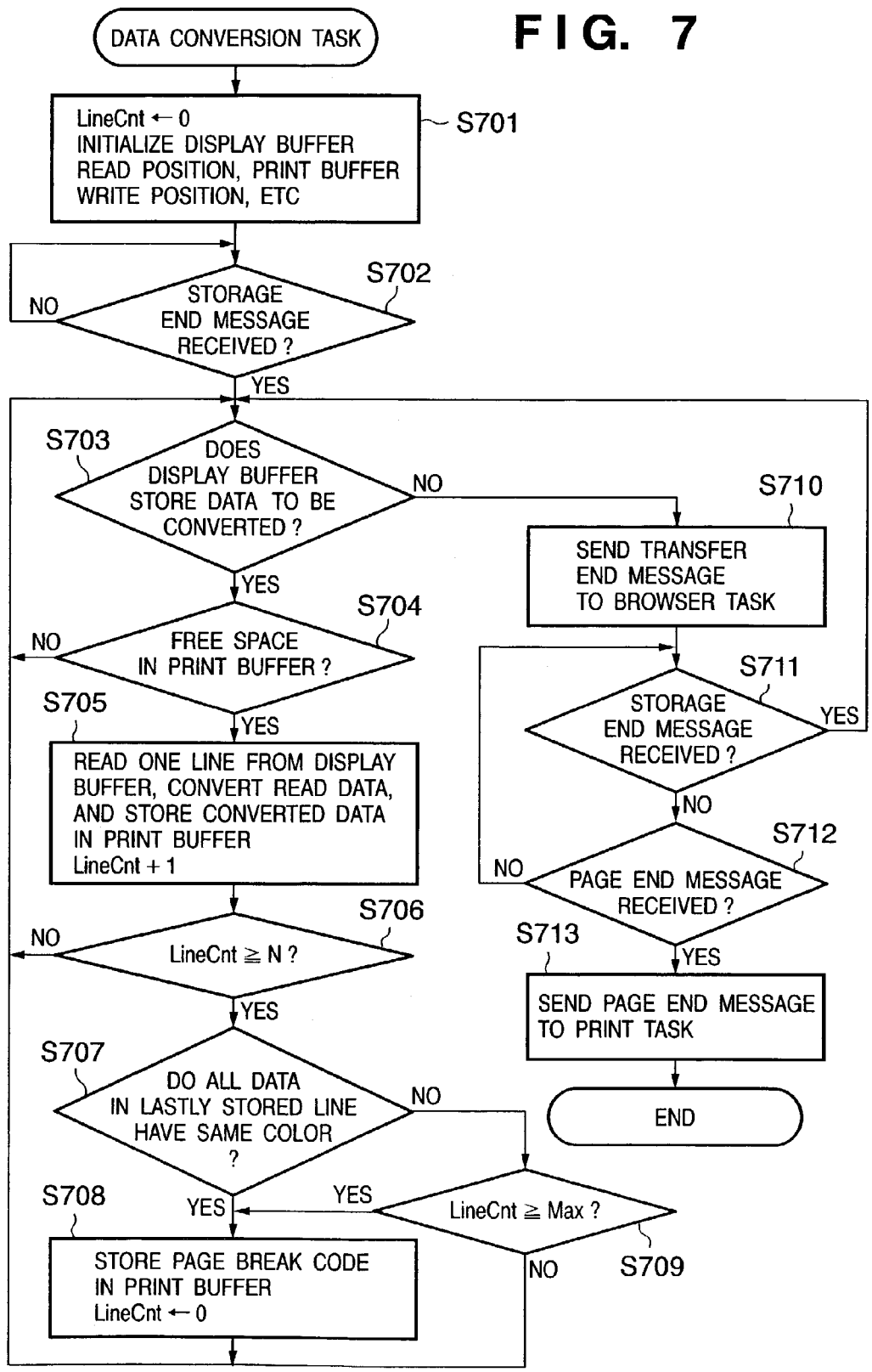

FIG. 7 is a flow chart showing the Web print process of the data conversion task 505 of this embodiment.

In step S701, various counters and the like are initialized. Zero is substituted in control variable LineCnt, the head position of the display buffer is set at the read start position from the display buffer, and the head position of the print buffer is set at the write start position to the print buffer.

It is checked in step S702 if the storage end message is received from the browser task 503. If YES in step S702, the flow advances to step S703.

Whether or not data to be converted remain stored in the display buffer is determined in step S703 on the basis of the display buffer read position, and the total number of lines appended to the storage end message as additional information. If data to be converted still remain, the flow advances to step S704; if no data to be converted remain, and all data stored in the display buffer have been processed, the flow advances to step S710.

It is checked in step S704 if the print buffer 506 has a free space for storing print data. If NO in step S704, the control repeats steps S703 and S704 and waits until a free space is formed by the process of the print task. If YES in step S704, the flow advances to step S705.

In step S705, data for one line is read out from the display buffer, and is converted into print data, which is stored in the print buffer 506. Then, control variable LineCnt is incremented by "1".

It is checked in step S706 if control variable LineCnt is smaller than a predetermined value N. Note that N is a page break reference line count, and is a value obtained by subtracting the number of vertical dots of a maximum font that can be rasterized by the browser task from the maximum recordable line count Max, or a value slightly smaller than that value. For example, in case of an A4 size, if the maximum recordable line count is 3800 and the number of vertical dots of a maximum font is 120, N is set to be 3680 or less. If YES in step S706, the flow advances to step S707 to execute a page break determination process in step S707 and subsequent steps. In this manner, if it is checked whether or not page break is required when the number of lines of the remaining recording region becomes equal to or smaller than the number of vertical dots of a maximum font, characters are never printed across two recording sheets.

It is checked in step S707 if all print data for one line, which are lastly stored in the print buffer 506, have the same color. If all data for one line have the same color, it can be determined that no characters are contained in that line (the spacing between neighboring lines). Hence, if a page break is inserted at that line, characters can be prevented from being printed across two pages. Despite a monochrome or color page, if all data for one line have the same color, it can be determined that they correspond to the background, and a line to break a page can be determined.

Hence, if all data for one line have the same color, the flow advances to step S708 to store a page break code in the print buffer 506 to make the print task execute a page break process. Then, 0 is substituted in control variable LineCnt for the next determination process. If all data for one line do not have the same color, the flow advances to step S709.

It is checked in step S709 if control variable LineCnt is smaller than Max. Note that Max is a maximum recordable line count per page of recording sheets. If the number of processed lines is equal to or larger than the maximum recordable line count Max at that time, the flow advances to step S708 to store a page break code in the print buffer 506 to make the print task execute a page break process.

Since it is determined that all data stored in the display buffer have been processed, a transfer end message is sent to the browser task 503 in step S710.

It is checked in step S711 if a storage end message of display data in the display buffer is received from the browser task 503. If YES in step S711, the flow returns to step S703 to process display data stored in the display buffer 504. On the other hand, if NO in step S711, the flow advances to step S712.

It is checked in step S712 if a page end message which indicates that the process for one Web page is complete is received from the browser task 503. If YES in step S712, a page end message is sent to the print task 507 in step S713, thus ending the process of the data conversion task. However, if NO in step S712, the flow returns to step S711 to wait for a message from the browser task by repeating steps S711 and S712.

Figure 8:
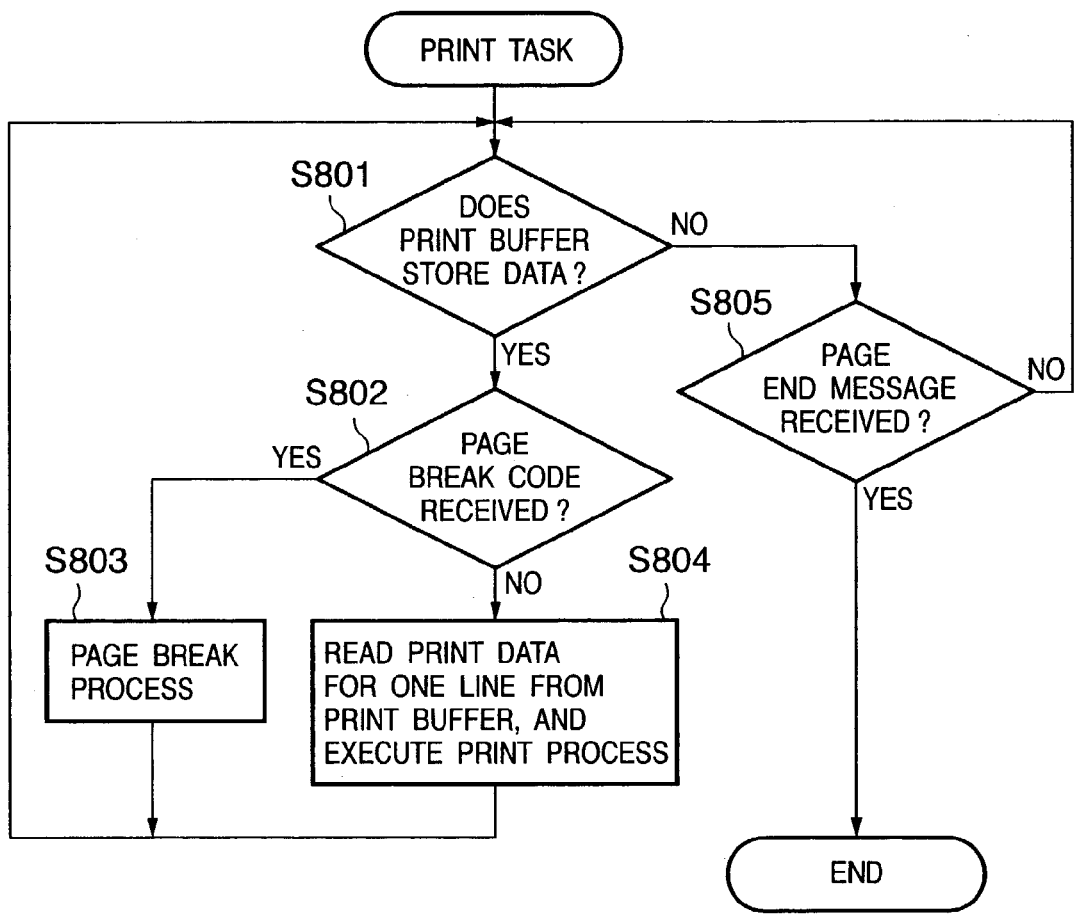

FIG. 8 is a flow chart showing the Web print operation of the print task 507 of this embodiment.

It is checked in step S801 if data to be processed remain in the print buffer 506. If such data remain, the flow advances to step S802; otherwise, the flow advances to step S805.

In step S802, data is read out from the print buffer 506, and it is checked if the readout data is a page break code. If YES in step S802, the flow advances to step S803 to execute a page break process which includes a discharge operation of a recording sheet whose recording is in progress, manipulation of various control variables, and the like. However, if NO in step S802, the flow advances to step S804.

In step S804, print data for one line is read from the print buffer 506, and a print process is executed.

It is checked in step S805 if a page end message is received from the data conversion task 505. If NO in step S805, the flow returns to step S801 to wait for storage of print data or a page end message from the data conversion task by repeating steps S801 and S805. If YES in step S805, the process of the print task ends.

As described above, according to the second embodiment, since the print buffer for several lines is inserted between the display buffer and printer, and the data conversion task is added, the same effect as in the above embodiment can be obtained even when a page break instruction is issued after data for several lines are stored in the memory.

With the aforementioned processes, upon printing a document on a Web, which is described using a markup language, when the number of lines which have been transferred to the printer becomes equal to or larger than a threshold value obtained by subtracting the vertical size (the number of dots) of a maximum font from the number of lines that can be recorded on one page, it is checked if all pixel data contained in one line to be transferred to the printer have the same color. If all pixel data have the same color, a page break instruction is output to the printer. In this manner, characters can be easily prevented from being broken at a page break position by executing a checking process for each line.

In the above embodiment, whether or not a page break is to be inserted is determined by examining if all pixel data contained in one line have the same color. However, the present invention is not limited to such specific process. For example, if all pixel data contained in one line fall within a predetermined density or color range, or if a repetition of a predetermined pattern of lines is detected, page break control may be done.

Furthermore, whether or not page break determination is to be made is determined in step S407 or S706 by checking if LineCnt is equal to or larger than N. Alternatively, the printer may include a detection means (sensor or the like) which detects the leading or trailing end of a recording sheet, and whether or not page break determination is to be made may be determined based on detection information of a recording sheet by this sensor. In this case, if the sensor has detected the leading end of a recording sheet but has not detected the trailing end yet, the flow advances to step S408 or S703; if the sensor has detected the trailing end after the leading end, the flow advances to step S410 or S707. Preferably, this sensor may be provided on the upstream of the recording position in the recording sheet convey direction, and a timing from when the sensor has detected the leading end of a recording sheet until the position of the recording sheet obtained by subtracting the maximum font size length from the maximum printable length of the printer may be calculated in advance or for each process. Then, whether or not page break determination is to be made may be determined using that timing, thus obtaining the same effect as in the above embodiments.

The sensor position may be determined so that print data output from the display buffer 204 or print buffer 506 at the detection timing of the trailing end of a recording sheet by the sensor forms a portion obtained by subtracting the maximum font size length from the maximum printable length of the printer, thus obtaining the same effect as in the above embodiments. In such case, page break determination may be done in response to detection of the trailing end of a recording sheet by the sensor as a trigger, and the above calculation can be omitted.

(Another Embodiment)

In each of the above embodiments, when the number of lines which have been transferred to the printer becomes equal to or larger than a threshold value obtained by subtracting the vertical size (the number of dots) of a maximum-size font from the number of lines that can be recorded on one page, the colors of pixel data contained in one line are checked. Note that the "maximum-size font" may be the maximum value of a font contained in that Web page. Before rasterizing data onto the display buffer, document data in a markup language may be interpreted to detect a font with the maximum size contained in that data.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

According to the present invention, an image processing apparatus and method, and a control program which can reliably and appropriately insert a page break by a simple process can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for determining a page break position on the basis of image data to be printed, comprising:
 a first conversion unit for converting document data described in a markup language into display data;
 a second conversion unit for converting the display data into print data for each line;
 a counting unit for counting the number of lines which have been converted by said second conversion unit from a head of one page;
 a first determination unit for determining whether or not a line converted by said second conversion unit is formed of only pixels contained within a predetermined color range; and
 a second determination unit for determining the line, which is determined to be formed of only pixels contained within a predetermined color range by said first determination unit, as a page break position, wherein said first determination unit starts determining when the number of lines counted by said counting unit reaches a value obtained by subtracting the number of lines included in a maximum size of a font which can be converted by said first conversion unit from the maximum number of lines that can be recorded per page.

2. An image processing method for determining a page break position on the basis of image data to be printed, comprising:

a first conversion step of converting document data described in a markup language into display data;

a second conversion step of converting the display data into print data for each line;

a counting step of counting the number of lines which have been converted in said second conversion step from a head of one page;

a first determination step of determining whether or not a line converted in said second conversion step is formed of only pixels contained within a predetermined color range; and a second determination step of determining the line, which is determined to be formed of only pixels contained within a predetermined color range in said first determination step, as a page break position, wherein said first determination step starts determining when the number of lines counted in said counting step reaches a value obtained by subtracting the number of lines included in a maximum size of a font which can be converted in said first conversion step from the maximum number of lines that can be recorded per page.

3. A computer-executable program stored on a computer-readable medium, the computer-executable program for making a computer implement an image processing method for determining a page break position on the basis of image data to be printed, said program making the computer execute:

a first conversion step of converting document data described in a markup language into display data;

a second conversion step of converting the display data into print data for each line;

a counting step of counting the number of lines which have been converted in said second conversion step from a head of one page;

a first determination step of determining whether or not a line converted in said second conversion step is formed of only pixels contained within a predetermined color range; and a second determination step of determining the line, which is determined to be formed of only pixels contained within a predetermined color range in said first determination step, as a page break position, wherein said first determination step starts determining when the number of lines counted in said counting step reaches a value obtained by subtracting the number of lines included in a maximum size of a font which can be converted in said first conversion step from the maximum number of lines that can be recorded per page.

4. A computer-readable storage medium storing a computer-executable program for making a computer implement an image processing method for determining a page break position on the basis of image data to be printed, said program making the computer execute;

a first conversion step of converting document data described in a markup language into display data;

a second conversion step of converting the display data into print data for each line;

a counting step of counting the number of lines which have been converted in said second conversion step from a head of one page;

a first determination step of determining whether or not a line converted in said second conversion step is formed of only pixels contained within a predetermined color range; and a second determination step of determining the line, which is determined to be formed of only pixels contained within a predetermined color range in said first determination step, as a page break position, wherein said first determination step starts determining when the number of lines counted in said counting step reaches a value obtained by subtracting the number of lines included in a maximum size of a font which can be converted in said first conversion step from the maximum number of lines that can be recorded per page.

5. An image processing apparatus for determining a page break position on the basis of image data to be printed, comprising;

a detection unit for detecting a maximum size of a font contained in the document data described in a markup language;

a conversion unit for converting said document data described in a markup language into print data for each line;

a counting unit for counting the number of lines which have been converted by said conversion unit from a head of one page;

a first determination unit for determining whether or not a line converted by said conversion unit is formed of only pixels contained within a predetermined color range; and a second determination unit for determining the line which is determined to be formed of only pixels contained within a predetermined color range by said first determination unit, as a page break position, wherein said first determination unit starts determining when the number of lines counted by said counting unit reaches a value obtained by subtracting the number of lines included in the maximum size of the font detected by said detection unit from the maximum number of lines that can be recorded per page.

* * * * *

UNITED STATES PATENT AND TRADEMARK OFFICE
CERTIFICATE OF CORRECTION

| | | |
|---|---|---|
| PATENT NO. | : 7,355,742 B2 | |
| APPLICATION NO. | : 10/387405 | |
| DATED | : April 8, 2008 | |
| INVENTOR(S) | : Okamura et al. | |

It is certified that error appears in the above-identified patent and that said Letters Patent is hereby corrected as shown below:

TITLE PAGE:
    Item 56, Foreign Patent Documents, "JP 2003345556A *  12/2003" should read -- JP2003-345556 A *   12/2003 --.

COLUMN 12:
    Line 8, "execute;" should read -- execute: --; and
    Line 33, "comprising;" should read -- comprising: --.

Signed and Sealed this

Twenty-eighth Day of October, 2008

JON W. DUDAS
*Director of the United States Patent and Trademark Office*